Patented June 19, 1934

1,963,511

UNITED STATES PATENT OFFICE

1,963,511

MOLDED BRAKE LINING MATERIAL

Andrew T. K. Tseng, Detroit, Mich., and Arthur B. Kempel and Robert Schar, East Brady, Pa., assignors to Rex-Hide Rubber Manufacturing Company, East Brady, Pa., a corporation of Pennsylvania No Drawing. Application May 7, 1932, Serial No. 609,984

4 Claims. (Cl. 106—7.5)

This invention relates to tractive-surface or friction compositions for use as facings for brake and clutch members and in other situations.

Our principal objects are to increase the life of the friction material, particularly when used in a brake, to avoid scoring of the brake drum or other opposing friction surface and to provide substantially uniform frictional qualities under all conditions, including those of high temperature created in severe brake service.

Heretofore, woven asbestos brake facings have been largely used, generally with a metallic wire reinforcement, and impregnated with various binders such as asphaltic or pitchy materials, polymerized oils, rubber, bakelite and similar phenolic condensation products, or combinations of two or more such substances. Those facings are usually pliable, comparatively soft and become easily glazed. Molded hard compositions of asbestos and other fibers, mineral fillers including litharge etc., carbon black, and various hard or semi-hard binders have also been employed with some success.

Asbestos, however, when present as the dominating mineral ingredient in a brake facing, acts as an abrasive under operating conditions often developed, particularly when the brake becomes very hot. It also absorbs water and oil to an objectionable extent. Carbon black, when employed in the relatively-small amounts heretofore proposed, and especially when not associated with another wear-resisting, non-fibrous mineral filler such as barytes or an equivalent, is unable to suppress the objectionable qualities of the asbestos or of the composition as a whole and impart to the composition dominating, characteristic qualities of its own. Consequently, the facings, whether woven or unwoven, do not have a uniform coefficient of friction, they are often subject to grabbing and squeaking, both they and the brake drums are rapidly worn under severe conditions, the drums are often badly scored and frequent adjustments or renewals are required in order to maintain proper braking conditions. By contrast, our composition is substantially non-absorptive of oil and water, substantially uniform in its frictional qualities under all conditions and characterized by a hardness which makes it practically non-compressible in service.

The defects of molded, unwoven brake-facing compositions are enhanced by wet-mixing methods employing binder solvents such as benzol or gasoline and using, as a binder ingredient, phenol resin which must contain an oil in the hardenable resin varnish in order to make the latter oil-soluble. Not only does wet-mixing involve expensive solvent-recovery apparatus or waste of solvent, along with drying operations followed by compression of the material to remove its spongy condition after evaporation of most of the solvent, but it is quite impossible to remove all of the solvent at the low drying temperatures which must be used to avoid vulcanization prior to final molding of the material. The resulting union of binder and mineral ingredients is less effective than that obtainable by hot, dry mixing and milling methods, the products is lacking in the necessary hardness, and the oil residues detract from its wearing qualities.

It is well known that the servicing of brakes has become a highly important and expensive part of automobile maintenance, and there has remained a wide demand for a better product, notwithstanding improvements which have heretofore been made.

Our invention largely overcomes the above-mentioned difficulties by providing a molded friction material of greatly improved qualities. The basis of our preferred composition is a heat-stable or non-heat-plastic, amorphous, organic binder such as a mixture of hard rubber and bakelite or other infusible synthetic resin and sulphur for vulcanization, together with gas black, commonly known as carbon black, or commercial carbon black or "channel" black, this latter ingredient being present in a relatively large quantity. This material, which is well known as having a marked reinforcing effect in rubber compositions by reason of its distinctive, hard, spiny particle formation, is produced by burning gas flames against cooled metal surfaces such as steel channels, and is distinguished from "thermatomic" carbon, produced by decomposition of hydrocarbon gas in a retort, which has a rounded particle and much less stiffening effect in such compositions. It is also distinguished from lampblack, which is soft and oily because of its mode of production from an oil flame. Asbestos or other fiber, largely in a ground-up, short-length condition and in much smaller proportion than has heretofore been customary, may be employed for the purpose of reducing the flowing tendency of the composition, together also with one or more non-fibrous, wear-resisting, powdered mineral fillers of which we prefer barium sulphate (barytes), and finally a small quantity of a substance which at the same time is a curing agent and to some extent a friction lubricant such as lead oxide (litharge).

Our preferred formula for the raw composition is as follows:

|  | Percent by weight | Percent by volume |
|---|---|---|
| Rubber (smoked sheets) | 14.2 | 33.2 |
| Bakelite suspension in water | 6.0 | 10.0 |
| Sulphur | 4.5 | 4.6 |
| Litharge | 8.8 | 2.0 |
| Barytes | 24.8 | 12.8 |
| Carbon black | 6.2 | 7.7 |
| Asbestos | 35.5 | 29.7 |
|  | 100.0 | 100.0 |

The heat-hardenable bakelite or other phenol resin liquid should not be of the oil-containing or oil-soluble type, but a water suspension or dispersion, attained by known means, of the familiar partial reaction product of phenol and formaldehyde. Any other oil-proof, heat-hardenable resin of the same general type may be employed, and any other amorphous or inorganic binder performing the same functions in the product would serve as an equivalent in place of the described composite binder. This formula has been arrived at after trying several hundred others, some of which, with different proportions or equivalent ingredients, more or less approach it in results and fall within the scope of our invention.

In making up this composition, any suitable dry-mixing method may be employed. We do not herein claim nor limit ourselves to the process which will be described, but prefer to proceed as follows. The rubber, litharge, barytes and carbon black are dry-mixed in the form of a master batch in a Banbury mixer, the working of the batch developing considerable heat which softens the rubber. After the material is cooled, it is broken down and the sulphur added on a roller mixing mill, where much less heat is developed because the carbon black and other mineral ingredients have already been worked into the batch. The asbestos and bakelite suspension are separately combined and mixed together in a dough mixer or tumbling device, in such a way as to distribute the bakelite uniformly throughout the asbestos. The proper amount of master batch containing sulphur is then broken down and the asbestos and bakelite mixture added thereto on a mill—mixing it very fast to prevent scorching. This material is removed from the mill, and formed by a three-roll calender in an intermediate sheet about .040" thick. It is built up on the bottom roll of the calender to a thickness of approximately .200". This is removed from the bottom roll of the calender, and immediately passed through a two-roll calender, which irons it down to the required gauge of about $\frac{3}{16}$ of an inch. If thicker or thinner finished material is desired, the gauges, or the number of plies are changed accordingly.

After this material has come from the ironing calender and is of the proper thickness, it is cut on an ordinary shear device into strip blanks in such a way that the fibers of asbestos run in a longitudinal direction with respect to the individual strips. These blanks are then placed in curved segment molds, and cured for 15 minutes at 50 lbs. of steam pressure under hydraulic pressure. Upon removal from the molds, the strips are subjected to a baking operation to complete the vulcanization of the rubber, and to harden the bakelite content. This is done by placing them in a hot-air oven for approximately 6 hours at 250 to 260 degrees Fah. The time of baking and the temperature will vary somewhat with the design of the oven. The forming and initial curing of the brake-lining segments for a relatively brief period in the shaping molds and the final curing of these semi-cured, shaped segments in open heat greatly reduces the amount of curing equipment required for a given quantity of product.

In handling this material on the mills, it will be necessary to keep the mixing mill just as cool as possible, and to accurately control the surface temperature of the calenders at approximately 130 deg. F. The mixing mill should preferably be a 60" mill with rolls 22" in diameter having even-speed roll surface, and should be equipped with a mixing apron.

During the cure in the presses, the rubber becomes partially vulcanized to a semi-hard rubber. The bakelite suspension originally contains about 20% of water, which is partially driven off during the mixing operation, and partially during the initial curing operation in the mold press. The balance will be driven off during the baking, as described above, and the rubber will become vulcanized to a real hard rubber. The combination of curing in the press and baking afterwards will change or polymerize the bakelite to an infusible and insoluble condition in accordance with a familiar reaction so that the combined binder in the molded composition is not adversely affected by heat as hard rubber alone would be.

The final material, when made according to the above formula, has a specific gravity of 2.18. It is substantially oil-free in the sense that it contains no important traces or quantities of unconverted oleaginous substances or mixtures such as oils, fats, or waxes; or residues of solvents physically combined with rubber or other binder ingredients and having a similar objectionable effect in the product, detracting from its hardness, wearing or oil-resisting qualities or the cohesion of the other ingredients.

The asbestos, when present, may be of the cheapest short-fiber grade, in a ground-up or semi-powdered form or largely reduced to that condition in the course of mixing, and appears rather sparsely as white flecks on ground or fractured faces of the final product.

The amount of carbon black which can be worked into rubber by dry milling is limited by the ability of the plastic rubber to "wet" or encase the carbon particles under the mixing conditions employed. Under a microscope, the gas-black particle shows a very spiny and irregular formation and has a relatively large surface in proportion to its volume. Therefore carbon black, as is well known, has a marked reinforcing, stiffening and wear-resisting effect in rubber compositions, even when present in minor volume or weight proportion to the rubber. By contrast, the barytes particle, or that of a similarly-acting mineral filler such as zinc oxide which might replace it in whole or in part in our composition, is smooth or pebble-like, with a relatively-small ratio of surface to volume, and larger quantities of it can be milled into and bound by the rubber.

Accordingly, since the carbon black employed in the above formula is, approximately, 18% of the volume and 31% of the weight of the total binder, or 23% of the volume and 44% of the weight of the rubber, it will be evident that the effective amount of this ingredient is relatively very great. This quantity, especially when present with a suitable amount of another non-fibrous, mineral, wear-resisting filler such as barytes, is so large that some of the filler, including the carbon black, is loosely held or semi-free in the binder, and a corner of the molded composition will leave a black streak or mark on paper, like a lead-pencil. The amount of carbon black is subject to variation between the limits of substantially 15 to 25% of the volume of the total binder. In the example, the carbon black and barytes together are nearly half or about 47% of the volume of the total binder, and over three times or 153% of the weight of the total binder.

On the other hand, the quantity of asbestos in our composition, as compared with prior ones for a like purpose, has been greatly reduced, relative to the total of the other ingredients, to the total binder, and to the non-fibrous mineral ingredients, including carbon black. In the formula given, the carbon black is about 26% of the volume and 17% of the weight of the asbestos. The volume of asbestos (29.7%) is less than that of the total binder (43.2%) and even less than that of the rubber (33.2%), although it may be more or less varied while remaining of the same general order. It represents an internal or subordinate phase, with its particles so isolated in the binder that the composition, as already indicated, will not absorb any substantial amount of liquid. The barytes and carbon black together are about 69% of the volume and 87% of the weight of the asbestos. This compares with prior wet-mixed, vulcanized, molded asbestos brake-linings having carbon black as an ingredient in the proportion of only about 7½% of the volume or 5% of the weight of the asbestos. So far as we are aware, no molded brake lining having a non-heat-plastic binder has previously employed barytes or an equivalent in combination with gas black, either with or without asbestos.

The litharge is a curing agent and its lead content also appears to have an effect on the brake facing which prevents grabbing against the opposing surface.

In our improved material, the relatively large proportion of carbon black exhibits the important property of holding the coefficient of friction substantially constant, which, as far as we know, is a new result in compositions for this and analogous purposes. In order that said ingredient shall have this friction-stabilizing effect in a brake lining containing asbestos, we have found it desirable to employ carbon black to the amount of not less than 20% of the volume of the asbestos. The non-fibrous mineral fillers, including the carbon black, are present in such large proportions as to impart dominating characteristics to the material, suppressing the objectionable qualities of the asbestos and affording highly superior wearing qualities. This material will not score the brake drums but imparts a high polish thereto and that quality is retained under the highest temperatures developed in brake service. As determined by extensive comparative tests, the wear on either the composition or the drums is so slight after long-continued and severe use that the necessity for adjustments and renewals is greatly reduced in comparison with all prior friction materials we have been able to find.

As previously indicated, the relative quantities of the ingredients may be more or less varied and equivalents for one or more of them may be used. Substances of minor effect can be added or omitted. If it is desired to lessen the coefficient of friction, part of the barytes can be replaced by graphite, or if the friction is to be increased, a part of the barytes may be replaced with an increased amount of carbon black. The percentage of the latter substance may be varied according to the design of the brake mechanism and the weight of the car. It is also quite possible to use other curing accelerators in place of the litharge, as substantially the same results have been obtained with several of the well-known organic accelerators.

Therefore, while a specific embodiment and procedure have been described, the invention is not to be limited except as required by the claims and the prior art.

We claim:

1. A brake lining comprising asbestos and carbon black and a binder which includes vulcanized hard rubber and an infusible, insoluble ingredient all combined in such proportions as to produce a lining which is non-absorptive to oil and water and has a uniform coefficient of friction.

2. A molded brake lining comprising a fiber, carbon black in the proportion of not substantially less than 20% of the volume of the fiber, and additional filler, all incorporated with an infusible, organic, oil-proof binder wherein the fiber particles are so isolated that the lining is water-proof and its ingredients including the carbon black impart a uniform coefficient of friction.

3. A molded brake lining comprising asbestos, carbon black in volume of the order of 25% of the asbestos, and a smooth-particle mineral filler, incorporated with a binder of hard rubber and an infusible, insoluble resinous ingredient, all combined to impart to the lining a uniform coefficient of friction and render it non-softening under extreme friction heat and non-absorptive of oil and water.

4. A molded and vulcanized friction composition comprising the mixture and reaction product of raw materials in approximately the following percentages by volume: rubber 33.2, water suspension of heat-hardenable, oil-proof phenol resin 10, sulphur 4.6, litharge 2, barytes 12.8, carbon black 7.7, asbestos 29.7.

ANDREW T. K. TSENG.
ARTHUR B. KEMPEL.
ROBERT SCHAR.